(No Model.)
E. B. CUTTEN.
METHOD OF ELECTROLYTICALLY PRODUCING SODA AND CHLORINE.
No. 491,700.  Patented Feb. 14, 1893.
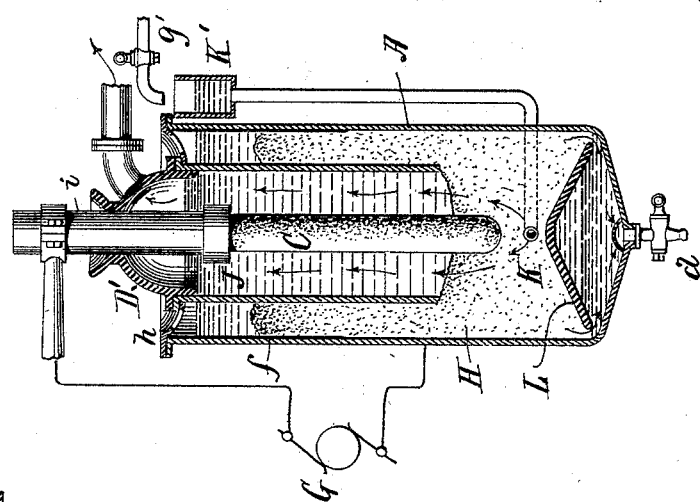
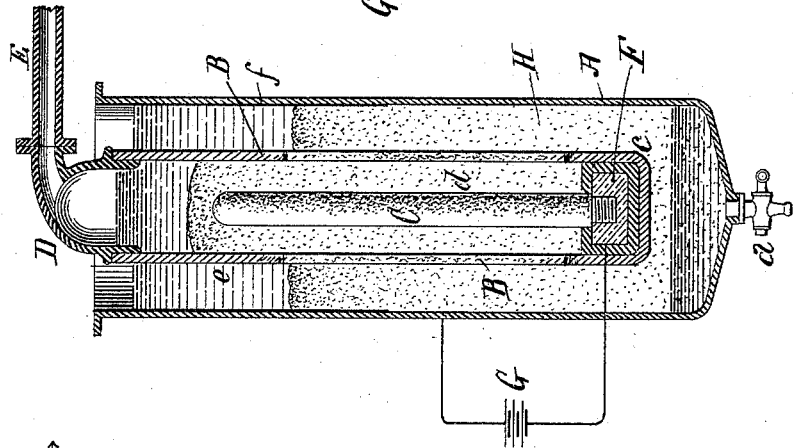
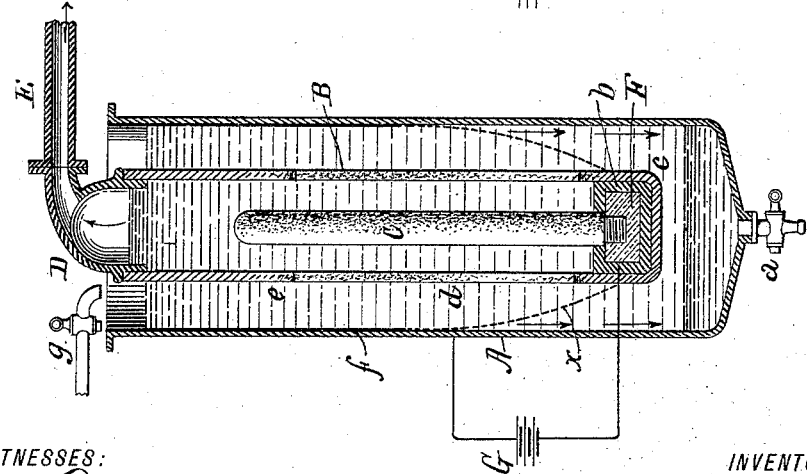
WITNESSES:
Gustave Dieterich
M. Posch
INVENTOR
Elisha B. Cutten
BY
Park Benjamin
ATTORNEY.

UNITED STATES PATENT OFFICE.

ELISHA B. CUTTEN, OF NEW YORK, N. Y.

METHOD OF ELECTROLYTICALLY PRODUCING SODA AND CHLORINE.

SPECIFICATION forming part of Letters Patent No. 491,700, dated February 14, 1893.

Application filed December 30, 1891. Serial No. 416,562. (No specimens.)

*To all whom it may concern:*

Be it known that I, ELISHA B. CUTTEN, of the city, county, and State of New York, have invented a new and useful Improvement in Methods of Electrolytically Producing Soda and Chlorine, of which the following is a specification.

It is well known that common salt, sodium chloride, (NaCl) can be electrolytically decomposed in its aqueous solution; chlorine, (Cl) being liberated at the anode, and sodium, Na, at the cathode; and that thereupon, by reason of the decomposition of the water, caustic soda, sodium hydrate, $(Na,H,O)$ is produced. The principal obstacles to the successful separation of chlorine and soda by this means are, first, the production of chlorinated soda (ClNaHO) by the combination of the chlorine and caustic soda in the cell, which, being a less stable compound than the sodium chloride, uselessly absorbs the electrical energy for its decomposition; and second, the weakening of the electrolyte due to the liberation of the solvent (water) at the surface of the anode, which in turn becomes decomposed at the expense of the current. I have discovered that these, as well as other difficulties well known in the operation, can be obviated by the new method hereinafter described, the principle of which is two-fold and is as follows:—To cause that part of the solution which, as the electrolytic process proceeds, becomes most heavily charged with soda, to become separated from the remainder of the solution. To reduce or prevent the possibilities of any combination of the chlorine and soda by mechanically removing the chlorine from the solution. The consequence is, first, the production of a very dense salt soda solution, from which the soda can be obtained by simple evaporation, and second, the separation of the chlorine in gaseous form. This chlorine I subsequently utilize.

My new process can be applied usefully in various ways and by different forms of apparatus. I herein illustrate certain definite forms of apparatus which I have practically used for the purpose, and by means of which said process may be carried into effect to cause beneficial results.

In the accompanying drawings, Figure 1 is a vertical transverse section of a simple electrolytic cell adapted to the purposes of my aforesaid process. Fig. 2 represents a similar view of the same cell containing undissolved salt. Fig. 3 is a similar view of a better form of electrolytic cell for practical use.

Similar letters of reference indicate like parts.

In Figs. 1 and 2, A is an iron containing vessel to which one terminal of the battery G is attached, so that said vessel forms the cathode. C is the anode, connected to the other terminal of battery G and preferably made of gas carbon. The anode C is received in a block F also of gas carbon, which is surrounded with insulating material $b$ and placed in the bottom of the porous cup B, so that it projects upward in said cup, as shown. The cup B is porous only over its middle portion $d$: above and below this part, as at $c$ and $e$, it is glazed and non-porous. The glazed portion at the lower part of the cup resists the disintegrating effect of the soda solution. Considerable space is left between the cup B and the bottom of the vessel A for the accumulation of the soda solution, which will thus be out of contact with the cup B. The upper part of the inner side of the vessel A is covered with varnish or other insulating coating $f$. The production of soda is thus limited to the cathode surface below this coating, the object being to render the upper portion of the salt solution in the vessel A as free as possible from soda. The bottom of the vessel A is funnel-shaped, and is provided with a faucet $a$ for convenience in drawing off the solution. The top of the cup B is completely closed by a cover D, into which opens a tube E which communicates with any suitable form of pump, exhauster or suction apparatus. The faucet $g$ controls the inflow to vessel A of the salt solution to be electrolyzed, which may be led from any suitable reservoir.

I will first describe the operation of the process as carried out in the cell illustrated in Fig. 1. The entire cell is filled with the salt solution. The pump in communication with pipe E is operated until the level of the liquid in cup B is from one-half an inch to an inch above that of the liquid in vessel A. The current is then established. The chlorine formed at the anode C, (or a very large percentage of it,) is mechanically drawn out of the liquid by the action of the pump and through the tube E to any suitable reservoir. Whatever chlorine may remain in the solution appears in the form of ascending bubbles close to the anode, while practically none is found at the wall of the porous cup. The change of color of the solution is, as the cholorine is drawn out of it, quite manifest. Meanwhile, in the vessel A, soda is formed and hydrogen is liberated, the latter, if unobstructed, rising along the wall of the vessel and escaping at the top. The soda descends along the wall, as shown by the arrows, most of it going to the bottom of the cell to form a strong soda solution, (indicated by the more heavily shaded part in the drawings,) and, of course, some mixing with the salt solution. It will be observed, however, that the dense soda solution is below the bottom of the porous cup, and that it goes to the bottom of the cell by its own gravity. The curved dotted line $x$ in Fig. 1 indicates somewhat approximately the proportion of soda becoming diffused in the solution in proportion to the vertical height of the latter above the bottom of the cell. It will be apparent from the preceding that toward the bottom of the cup B where the chlorine solution on the interior is weakest, the soda solution on the exterior is strongest; while toward the top of the vessel A where the soda solution on the exterior of the cup B is weakest, the chlorine solution within said cup is the strongest. It will be apparent also that wherever either solution comes in contact with the porous part of cup B, it is very weak. It will thus be seen that even without the use of the suction apparatus for removing the chlorine, the arrangement of the cells is such that the soda solution tends to separate itself from the chlorine solution by the action of gravity; and when it is so separated, it is not in a position to be strongly acted upon by the chlorine solution. But, as has been described, in addition to the self-separation by gravity of the soda, I provide the mechanical abstraction of the chlorine from the solution; so that the soda is prevented from attack by the chlorine in two ways; first, as a consequence of its own gravitation to a place where the chlorine cannot easily get to it, and second, by removing the chlorine mechanically as fast as it is generated. I find that these results are abundantly shown to be true by practical trials of the cell.

I have stated that in Fig. 1 the electrolyte is renewed from the faucet $g$ leading to a suitable reservoir. I find it better in practice to use the arrangement shown in Fig. 2, in which salt is directly packed in both the outer vessel and in the porous cup, as shown at H and I. In this case, the soda solution, drawn off at the bottom through the faucet $a$, is much stronger than before; while that in the upper part of the vessel, especially such as is in contact with the porous wall $d$, is much weaker. At the same time, waste of power, due to the generation of oxygen in the cup B and the disadvantages incident to the drawing off of oxygen mixed with the chlorine from said vessel, is avoided. Almost all the caustic soda, as it is generated, percolates down against the outer wall of the outer vessel, while the chlorine following the anode C goes directly upward.

While the form of cell illustrated in Figs. 1 and 2 is perfectly operative for the purposes of my process, it possesses the usual disadvantages incident to the employment of porous cups in general; namely, that the porous partition interposes resistance in the circuit, and even under the action of weak soda solution is subject to disintegration in time.

In Fig. 3 I illustrate a form of electrolytic cell in which the foregoing difficulties are entirely overcome. Here, the porous cup B is wholly removed and in place thereof there is substituted a vessel J, open at the bottom and preferably made of glass. It is supported in any suitable manner; as, for example, by arms or brackets $h$ projecting inwardly from the top of the outer vessel A, upon which brackets a flange on the inner cylinder J rests, as shown. The anode C is supported in any suitable sleeve $i$ of insulating material which extends through the cover D' of the vessel J; and said anode extends, as shown, in the drawings, downward, somewhat below the bottom of the cylinder J. The body of the vessel A is filled with salt, as shown at H. I have found, however, that even when salt is not used, no perceptible quantity of hydrogen is drawn into the cylinder J even under a suction much more powerful than that which meets all the requirements of the process; hence there is no waste of power due to the generation of the hydro-chloric acid due to the union of hydrogen with the chlorine. When the body of salt H is not employed, the anode C may be made shorter; not extending below the lower edge of the cylinder J.

I find that it is advantageous to introduce a current of saturated salt solution upwardly along the surface of the anode. To this end, I cause a delivery of salt solution from any suitable reservoir through the faucet $g'$ to a tank K'. From the tank K' extends a pipe which opens into the vessel A at K. The salt solution then rises up from the pipe K, as indicated by the arrows in Fig. 3. Near the bottom of the vessel A is a plate or partition L preferably of glass, which causes the descending soda solution to pass outwardly away from the anode, and also serves to intercept any bubbles of hydrogen which may be liberated from the bottom of the tank and prevent their ascent into the cylinder J. The insulating coating $f$ may be omitted in this form of cell, if desired, but it is best to provide it in order to prevent the generation of soda in the upper part of the outer vessel. It will be observed that in this form of cell, the separation of the soda solution is effected by gravity alone; and that the difficulties incident to the use of a porous cup are avoided.

I claim:—

1. The method of separating a gas from a chemical compound containing the same, which consists in subjecting said chemical compound to electrolysis in a closed receptacle, and then withdrawing from the electrolyte by suitably exhausting the atmosphere above the same the gas which is generated by electro-decomposition within the fluid mass of said electrolyte.

2. The method of electrolytically producing caustic soda, which consists, first, in electrolyzing an aqueous solution of sodium chloride to produce chlorine and soda in said solution, and, second, withdrawing said chlorine from said solution by suitably exhausting the atmosphere above said solution.

3. The method of electrolytically producing a strong caustic soda solution, which consists in electrolyzing a solution of sodium chloride to produce chlorine and soda, and simultaneously preventing access of the freed chlorine to the freed sodium, causing said chlorine in gaseous form to rise to the upper portion of the electrolyte, and the said soda to accumulate by its own gravity at the lower portion thereof.

4. The method of electrolytically producing a strong caustic soda solution, which consists in electrolyzing a solution of sodium chloride in the presence of a comminuted solid disposed in the electrolytic cell and in contact with the cathode thereof, whereby the diffusion of the generated soda is substantially prevented and substantially all of said soda is caused to gravitate to the bottom of the cell.

5. The method of electrolytically producing a strong caustic soda solution, and also chlorine in gaseous form, which consists in electrolyzing an aqueous solution of sodium chloride to produce chlorine and soda in said solution; second, withdrawing the chlorine from the body of said solution, and hence away from the generated soda by suitably exhausting the atmosphere above said solution, and simultaneously preventing access to one another of the chlorine and soda within said solution; causing said chlorine to rise to the upper part of the electrolyte, and the said soda to accumulate by its own gravity at the bottom part thereof.

ELISHA B. CUTTEN.

Witnesses:
H. R. MOLLER,
M. BOSCH.